United States Patent
Ozaki et al.

(10) Patent No.: US 12,363,745 B2
(45) Date of Patent: Jul. 15, 2025

(54) BASE WIRELESS DEVICE AND COMMUNICATION METHOD OF BASE WIRELESS DEVICE

(71) Applicant: SMC CORPORATION, Tokyo (JP)

(72) Inventors: Norimasa Ozaki, Moriya (JP); Toshiaki Kuwahara, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 426 days.

(21) Appl. No.: 17/663,732

(22) Filed: May 17, 2022

(65) Prior Publication Data
US 2022/0377743 A1 Nov. 24, 2022

(30) Foreign Application Priority Data

May 21, 2021 (JP) .................. 2021-085809

(51) Int. Cl.
*H04W 72/0453* (2023.01)
*H04B 1/713* (2011.01)
(Continued)

(52) U.S. Cl.
CPC ............ *H04W 72/53* (2023.01); *H04B 1/713* (2013.01); *H04W 72/0453* (2013.01);
(Continued)

(58) Field of Classification Search
None
See application file for complete search history.

(56) References Cited

U.S. PATENT DOCUMENTS 6,728,550 B1 * 4/2004 Bohnke ................ H04W 52/04
375/135
7,173,919 B1 * 2/2007 Dabak .................... H04B 1/707
370/335
(Continued)

FOREIGN PATENT DOCUMENTS

| JP | 2015-534360 | 11/2015 |
|---|---|---|
| JP | 2017-525254 | 8/2017 |
| JP | 2017-188868 A | 10/2017 |

OTHER PUBLICATIONS

Extended European Search Report issued Oct. 21, 2022 in European Patent Application No. 22174124.2, 8 pages.
(Continued)

*Primary Examiner* — San Htun
(74) *Attorney, Agent, or Firm* — Oblon, McClelland, Maier & Neustadt, L.L.P.

(57) ABSTRACT

A base wireless device includes a selection unit configured to select either signal transmission or standby, and a transmission processing unit configured to perform a transmission process of transmitting a signal to at least one remote wireless device in a case that the selection unit selects the signal transmission, and to stand by without performing the transmission process in a case that the selection unit selects the standby. The selection unit selects either the signal transmission or the standby in a current transmission/reception period in accordance with a predetermined rule in a case that the signal transmission was selected in a previous transmission/reception period, and selects the signal transmission in the current transmission/reception period in a case that the standby was selected in the previous transmission/reception period.

2 Claims, 3 Drawing Sheets

(51) Int. Cl.
*H04W 52/28* (2009.01)
*H04W 72/53* (2023.01)
*H04W 88/18* (2009.01)
*H04W 88/08* (2009.01)

(52) U.S. Cl.
CPC .......... *H04W 88/188* (2013.01); *H04W 52/28* (2013.01); *H04W 88/08* (2013.01)

(56) References Cited

U.S. PATENT DOCUMENTS

| | | | |
|---|---|---|---|
| 9,332,494 B1* | 5/2016 | Yuan | H04W 52/0216 |
| 2005/0135302 A1* | 6/2005 | Wang | H04W 52/0216 |
| | | | 370/329 |
| 2010/0111003 A1* | 5/2010 | Phan Huy | H04L 1/0003 |
| | | | 455/450 |
| 2014/0073328 A1* | 3/2014 | Ho | H04W 36/18 |
| | | | 455/438 |
| 2014/0133335 A1* | 5/2014 | Morioka | H04W 72/20 |
| | | | 370/252 |
| 2017/0289959 A1 | 10/2017 | Aki et al. | |
| 2017/0303187 A1 | 10/2017 | Crouthamel et al. | |
| 2019/0159048 A1* | 5/2019 | Feldkamp | H04L 43/08 |

OTHER PUBLICATIONS

Office Action issued Jan. 14, 2025, in Japanese Patent Application No. 2021-085809 filed May 21, 2021, 8 pages (w/English translation).

* cited by examiner

BASE WIRELESS DEVICE AND COMMUNICATION METHOD OF BASE WIRELESS DEVICE

CROSS-REFERENCE TO RELATED APPLICATIONS

This application is based upon and claims the benefit of priority from Japanese Patent Application No. 2021-085809 filed on May 21, 2021, the contents of which are incorporated herein by reference.

BACKGROUND OF THE INVENTION

Field of the Invention

The present invention relates to a base wireless device that transmits and receives signals to and from at least one remote wireless device in a transmission/reception period, and a communication method of the base wireless device.

Description of the Related Art

JP 2017-188868 A discloses an industrial wireless communication system including a computer and a plurality of communication networks. The computer manages and controls a plurality of robots and the like. Each communication network includes a single base wireless device and a plurality of remote wireless devices. The base wireless device is connected to the computer. Meanwhile, each remote wireless device is connected to a sensor and an actuator. The sensor and the actuator are provided for a robot or the like. For example, the base wireless device transmits a signal for instructing the operation of the actuator to each remote wireless device. In contrast, each remote wireless device transmits a signal indicating a detection result of the sensor or the like to the base wireless device. In the wireless communication system disclosed in JP 2017-188868 A, the base wireless device and the plurality of remote wireless devices carry out frequency hopping at predetermined periods. This prevents radio wave interference between the base wireless device and the surrounding wireless devices. Similarly, radio wave interference between each remote wireless device and the surrounding wireless devices is prevented. The period for frequency hopping is referred to as a transmission/reception period.

SUMMARY OF THE INVENTION

The base wireless device, while transmitting signals to the remote wireless devices, is unable to receive signals transmitted from the remote wireless devices. Thus, while the base wireless device is transmitting a signal, the remote wireless devices fail to transmit a signal. After the base wireless device has finished transmitting the signal, signal transmissions carried out by the remote wireless devices are made successfully. Then, it may take a long time to complete the signal transmissions from the remote wireless devices to the base wireless device. As a result, the communication speed of the wireless communication system decreases, and the processing capability of the robot or the like decreases.

An object of the present invention is to solve the aforementioned problem.

According to a first aspect of the present invention, a base wireless device that transmits and receives signals to and from at least one remote wireless device in a transmission/reception period, includes a selection unit configured to select either signal transmission or standby in the transmission/reception period, and a transmission processing unit configured to perform a transmission process of transmitting a signal to the at least one remote wireless device in the transmission/reception period in a case that the selection unit selects the signal transmission, and to stand by without performing the transmission process in the transmission/reception period in a case that the selection unit selects the standby, wherein the selection unit selects either the signal transmission or the standby in a current transmission/reception period in accordance with a predetermined rule in a case that the signal transmission was selected in a previous transmission/reception period, and selects the signal transmission in the current transmission/reception period in a case that the standby was selected in the previous transmission/reception period.

According to a second aspect of the present invention, a communication method of a base wireless device that transmits and receives signals to and from at least one remote wireless device in a transmission/reception period, is provided. The communication method includes a selection step of selecting either signal transmission or standby in the transmission/reception period, and a transmission processing step of performing a transmission process of transmitting a signal to the at least one remote wireless device in the transmission/reception period in a case that the signal transmission is selected in the selection step, and standing by without performing the transmission process in the transmission/reception period in a case that the standby is selected in the selection step, wherein in the selection step, either the signal transmission or the standby is selected in a current transmission/reception period in accordance with a predetermined rule in a case that the signal transmission was selected in a previous transmission/reception period, and the signal transmission is selected in the current transmission/reception period in a case that the standby was selected in the previous transmission/reception period.

According to the present invention, it is possible to shorten the time required for successful signal transmission of the remote wireless device.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

[1 Wireless Communication System 10]

Figure 1:
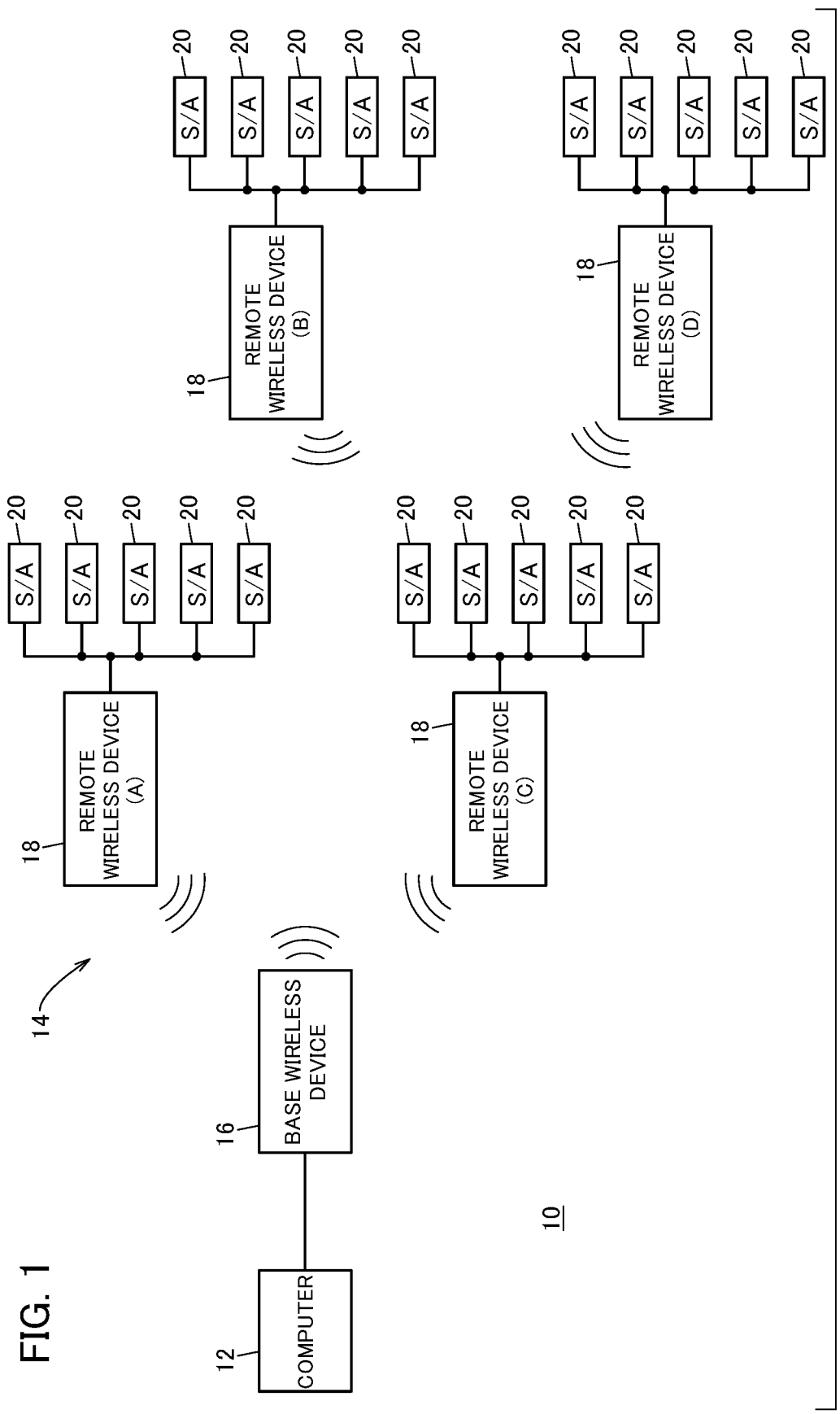
FIG. 1 is a diagram illustrating a configuration of a wireless communication system.
Figure 2:
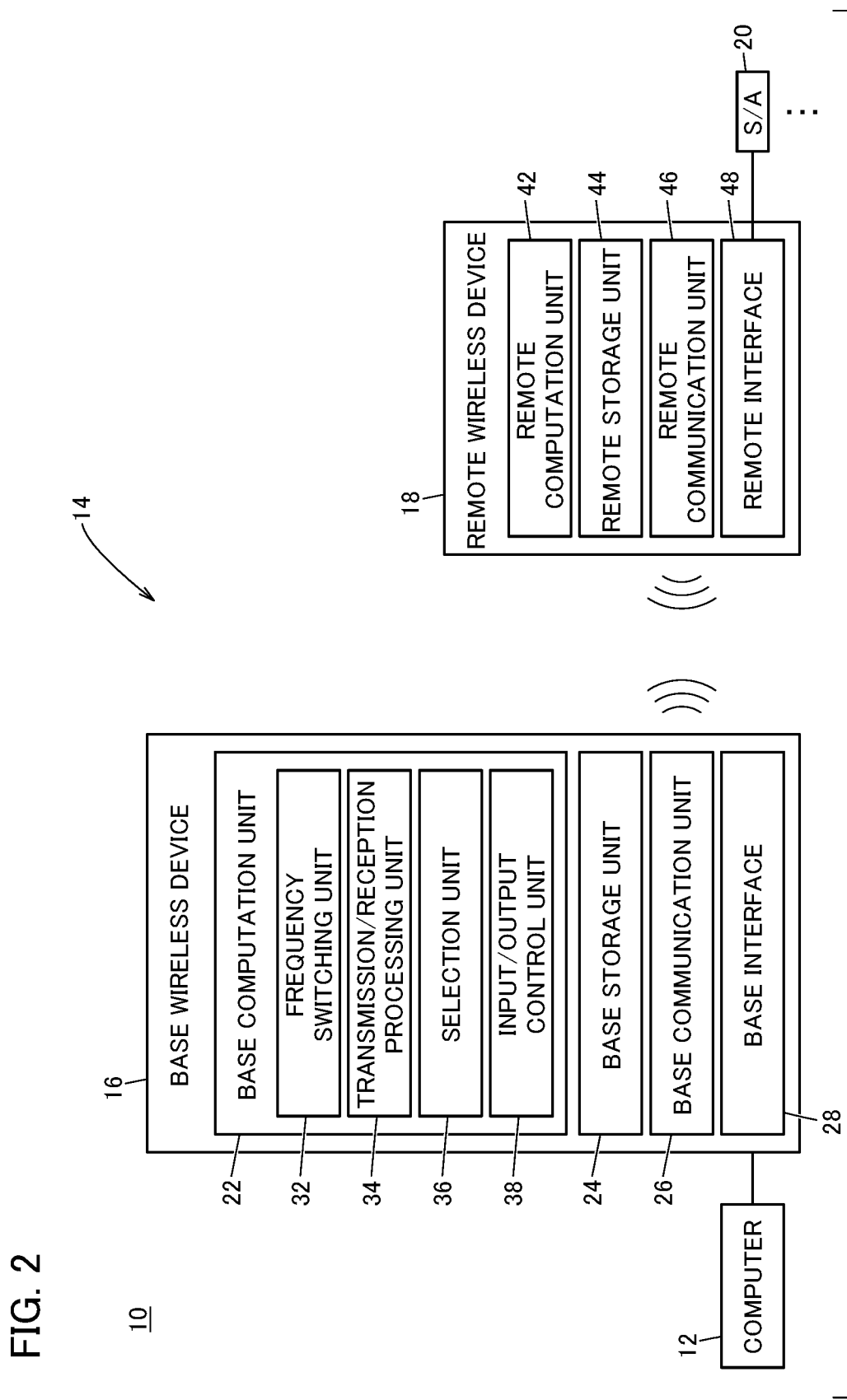
FIG. 2 is a functional block diagram of the wireless communication system according to the present embodiment.

FIG. 1 is a diagram illustrating a configuration of a wireless communication system 10. FIG. 2 is a functional block diagram of the wireless communication system 10 according to the present embodiment. The industrial wireless communication system 10 includes a single computer 12 and at least one communication network 14. The one communication network 14 includes a single base wireless device 16 and a plurality of remote wireless devices 18. An industrial facility is provided with one or more robots (not shown).

The computer 12 monitors and controls one or a plurality of robots and the like. The computer 12 may include, for example, a programmable logic controller (PLC). The computer 12 includes an interface (not illustrated) for performing wired or wireless transmission and reception. The computer 12 transmits a signal to the base wireless device 16 via the interface. The computer 12 also receives a signal transmitted from the base wireless device 16 via the interface.

One or more robots or the like include one or more actuators and one or more sensors. The actuator operates in accordance with instructions from the computer 12. The sensor detects an operation of the robot. The sensor and actuator are also collectively referred to herein as an S/A 20. The actuator receives a control signal transmitted from the computer 12 via the base wireless device 16 and the remote wireless device 18. The sensor transmits a sensor signal indicative of the detection result to the computer 12 via the base wireless device 16 and the remote wireless device 18.

[2 Base Wireless Device 16]

As illustrated in FIG. 2, the base wireless device 16 includes a base computation unit 22, a base storage unit 24, a base communication unit 26, and a base interface 28.

The base computation unit 22 includes processing circuitry. The processing circuitry may be a processor such as a CPU. The processing circuitry may be an integrated circuit such as an ASIC, an FPGA, or the like. The processor has various functions by executing programs stored in the base storage unit 24. The base computation unit 22 functions as a frequency switching unit 32, a transmission/reception processing unit 34, a selection unit 36, and an input/output control unit 38.

The frequency switching unit 32 switches the frequency of the channel used by the base communication unit 26 based on hopping information. The hopping information is stored in advance in the base storage unit 24.

The transmission/reception processing unit (transmission processing unit) 34 uses the transmission circuit of the base communication unit 26 to perform a process of transmitting a signal to the remote wireless device 18. This process is referred to as a transmission process. In addition, the transmission/reception processing unit 34 uses the reception circuit of the base communication unit 26 to perform a process of receiving a signal transmitted by the remote wireless device 18. The transmission/reception processing unit 34 transmits a signal of one packet in one transmission/reception period. The transmission/reception processing unit 34 performs a series of transmission process when transmitting a signal of one packet. The transmission process includes a process of transmitting a signal and a process of receiving an acknowledgement (ACK) transmitted from the remote wireless device 18.

The selection unit 36 selects either signal transmission or standby in each transmission/reception period. For example, when the signal transmission was selected in the previous transmission/reception period, the selection unit 36 selects either the signal transmission or the standby in the current transmission/reception period. At this time, the selection unit 36 makes a selection in accordance with a predetermined rule. The predetermined rule is stored in the base storage unit 24. For example, the predetermined rule may be information that determines a selection order of signal transmission and standby. Further, the predetermined rule may be an algorithm etc. for making a selection at random, for example, an algorithm for generating a pseudo random number sequence.

On the other hand, when standby was selected in the previous transmission/reception period, the selection unit 36 selects signal transmission in the current transmission/reception period.

The input/output control unit 38 uses the base interface 28 to perform a process of transmitting a sensor signal received from the remote wireless device 18 to the computer 12. The input/output control unit 38 uses the base interface 28 to perform a process of receiving a control signal transmitted by the computer 12.

The base storage unit 24 includes a volatile memory and a nonvolatile memory. Examples of the volatile memory include a RAM. Examples of the nonvolatile memory include a ROM, a flash memory, and the like. The volatile memory stores, for example, data acquired externally and data calculated by the base computation unit 22. The nonvolatile memory stores, for example, a predetermined program and a predetermined numerical value. The base storage unit 24 stores hopping information that is common to the remote wireless devices 18. The hopping information includes information of a hopping pattern and information of a transmission/reception period. At least a part of the base storage unit 24 may be included in a processor, an integrated circuit, or the like as described above.

The base communication unit 26 includes a communication circuit. The communication circuit includes a transmission circuit and a reception circuit. The base communication unit 26 transmits a signal to the remote wireless device 18. The base communication unit 26 receives a signal transmitted by the remote wireless device 18.

The base interface 28 includes an input/output interface for carrying out wired communication with the computer 12.

[3 Remote Wireless Device 18]

As shown in FIG. 2, the remote wireless device 18 includes a remote computation unit 42, a remote storage unit 44, a remote communication unit 46, and a remote interface 48.

The remote computation unit 42 includes processing circuitry. The processing circuitry may be a processor such as a CPU. The processing circuitry may be an integrated circuit such as an ASIC, an FPGA, or the like. The processor has various functions by executing programs stored in the remote storage unit 44. For example, the remote computation unit 42 uses the remote interface 48 to perform a process of transmitting a control signal to the S/A 20. In addition, the remote computation unit 42 uses the remote interface 48 to perform a process of receiving a sensor signal from the S/A 20. The remote computation unit 42 uses the remote communication unit 46 to perform a process of receiving a signal from the base wireless device 16. Further, the remote computation unit 42 uses the remote communication unit 46 to perform a process of transmitting a signal to the base wireless device 16. Further, the remote computation unit 42 switches the frequency of a channel used for communication with each of the remote wireless devices 18 based on the hopping information.

The remote storage unit 44 includes a volatile memory and a nonvolatile memory. Examples of the volatile memory include a RAM. Examples of the nonvolatile memory include a ROM, a flash memory, and the like. The volatile memory stores, for example, data acquired externally and data calculated by the remote computation unit 42. The nonvolatile memory stores, for example, a predetermined program and a predetermined numerical value. The remote storage unit 44 stores hopping information that is common to the base wireless device 16. The hopping information includes information of a hopping pattern and information of a transmission/reception period. At least a part of the remote storage unit 44 may be included in a processor, an integrated circuit, or the like as described above.

The remote communication unit 46 includes a communication circuit. The communication circuit includes a transmission circuit and a reception circuit. The remote communication unit 46 transmits a signal to the base wireless device 16. The remote communication unit 46 receives a signal transmitted by the base wireless device 16.

The remote interface 48 includes an input/output interface for carrying out wired communication with each S/A 20. The remote interface 48 may include a wireless interface for carrying out short-range wireless communication with each S/A 20.

[4 Processing Performed by Base Wireless Device 16]

Figure 3:
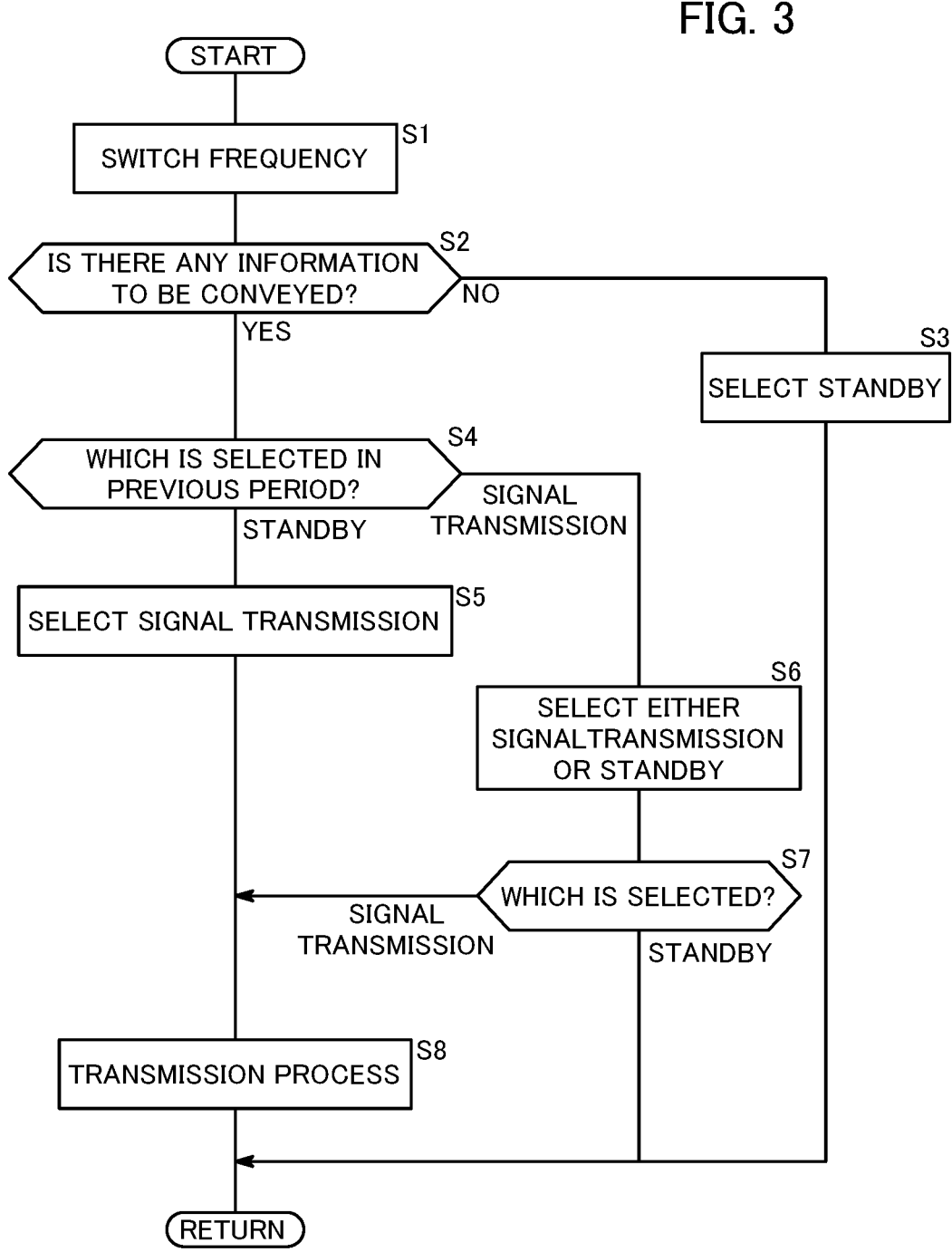
FIG. 3 is a flowchart illustrating a process according to the present embodiment.

A process of the base wireless device 16 related to transmission will be described with reference to FIG. 3. FIG. 3 is a flowchart illustrating a process according to the present embodiment. The base computation unit 22 performs the process shown in FIG. 3 for each transmission/reception period.

In step S1, the frequency switching unit 32 switches the channel frequency in accordance with the hopping pattern stored in the base storage unit 24. Upon completion of step S1, the process proceeds to step S2.

In step S2, the transmission/reception processing unit 34 determines whether there is any information to be conveyed to the S/A 20. The information to be conveyed is, for example, a control signal acquired from the computer 12. If there is such information to be conveyed (step S2: YES), the process proceeds to step S4. On the other hand, when there is not any information to be conveyed (step S2: NO), the process proceeds to step S3.

In step S3, the selection unit 36 selects standby in the current transmission/reception period. Here, the selection unit 36 stores the selection result of standby in the base storage unit 24. When step S3 ends, the process in the current transmission/reception period is completed.

In step S4, the selection unit 36 determines the selection result of the selection unit 36 in the previous transmission/reception period. The selection result is stored in the base storage unit 24. If the selection result is standby (step S4: standby), the process proceeds to step S5. On the other hand, when the selection result is signal transmission (step S4: signal transmission), the process proceeds to step S6. When the selection result is not recorded in the base storage unit 24, the selection unit 36 determines that the selection result is standby.

When the process proceeds from step S4 to step S5, the selection unit 36 selects to transmit a signal in the current transmission/reception period. The selection unit 36 stores the selection result of signal transmission in the base storage unit 24. Upon completion of step S5, the process proceeds to step S8.

When the process proceeds from step S4 to step S6, the selection unit 36 selects whether to transmit a signal in the current transmission/reception period or to stand by in the current transmission/reception period, in accordance with a predetermined rule. The selection unit 36 causes the base storage unit 24 to store the selection result that is either signal transmission or standby. Upon completion of step S6, the process proceeds to step S7.

When the selection unit 36 selects signal transmission in step S6 (step S7: signal transmission), the process proceeds to step S8. On the other hand, when the selection unit 36 selects standby in step S6 (step S7: standby), the transmission/reception processing unit 34 stands by in the current transmission/reception period. That is, the base wireless device 16 creates an opportunity to receive a signal transmitted by the remote wireless device 18. At this time, when any one of the remote wireless devices 18 transmits a signal to the base wireless device 16, the transmission/reception processing unit 34 performs a process for receiving the signal. When step S7 ends, the process in the current transmission/reception period is completed.

When the process proceeds from step S5 or step S7 to step S8, the transmission/reception processing unit 34 performs a transmission process. At this time, the transmission/reception processing unit 34 uses the base communication unit 26 to perform a process of transmitting a signal indicating information to be conveyed, to the remote wireless device 18. When step S8 ends, the process in the current transmission/reception period is completed.

According to the present embodiment, when signal transmission was selected in the previous transmission/reception period, the selection unit 36 selects whether to transmit a signal or to stand by in the current transmission/reception period. At this time, the selection unit 36 basically selects standby with a probability of ½. Therefore, the base wireless device 16 is less likely to continue transmitting a signal for a long time. In other words, the base wireless device 16 has more opportunities to receive signals. Therefore, according to the present embodiment, it is possible to shorten the time taken until the signal transmission of the remote wireless device 18 is made successfully.

According to the present embodiment, when standby was selected in the previous transmission/reception period, the selection unit 36 selects signal transmission in the current transmission/reception period. Thus, in the base wireless device 16, the opportunities to transmit signals are not fewer than the opportunities to receive signals.

[5 Technical Concepts Obtained from the Embodiment]

A description will be given below concerning the technical concepts that can be grasped from the above-described embodiments.

According to a first aspect of the present invention, the base wireless device 16 transmits and receives signals to and from at least one remote wireless device 18 in a transmission/reception period, and includes the selection unit 36 configured to select either signal transmission or standby in the transmission/reception period, and the transmission processing unit (transmission/reception processing unit 34) configured to perform a transmission process of transmitting a signal to the at least one remote wireless device 18 in the transmission/reception period in a case that the selection unit 36 selects the signal transmission, and to stand by without performing the transmission process in the transmission/reception period in a case that the selection unit 36 selects the standby, wherein the selection unit 36 selects either the signal transmission or the standby in a current transmission/reception period in accordance with a predetermined rule in a case that the signal transmission was selected in a previous transmission/reception period, and selects the signal transmission in the current transmission/reception period in a case that the standby was selected in the previous transmission/reception period.

According to the first aspect of the present invention, the selection unit 36 may use an algorithm for making a selection at random, to select either the signal transmission or the standby.

According to a second aspect of the present invention, the communication method of the base wireless device 16 that transmits and receives signals to and from at least one remote wireless device 18 in a transmission/reception period, is provided. The communication method includes a selection step of selecting either signal transmission or standby in the transmission/reception period, and a transmission processing step of performing a transmission process of transmitting a signal to the at least one remote wireless device in the transmission/reception period in a case that the signal transmission is selected in the selection step, and standing by without performing the transmission process in the transmission/reception period in a case that the standby is selected in the selection step, wherein in the selection step, either the signal transmission or the standby is selected in a current transmission/reception period in accordance with a predetermined rule in a case that the signal transmission was selected in a previous transmission/reception period, and the signal transmission is selected in the current transmission/reception period in a case that the standby was selected in the previous transmission/reception period.

According to the second aspect of the present invention, in the selection step, either the signal transmission or the standby may be selected using an algorithm for making a selection at random.

The present invention is not particularly limited to the embodiment described above, and various modifications are possible without departing from the essence and gist of the present invention.

What is claimed is:

1. A base wireless device that transmits and receives signals to and from at least one remote wireless device in a transmission and/or reception period, comprising one or more processors that execute computer-executable instructions stored in a memory,
   wherein the one or more processors execute the computer-executable instructions to cause the base wireless device to:
   select either signal transmission or standby in a current transmission and/or reception period on a basis of information indicative of selection of either signal transmission or standby in a previous transmission and/or reception period;
   in a case that the signal transmission is selected, perform a transmission process of transmitting a signal to the at least one remote wireless device in the current transmission and/or reception, and in a case that the standby is selected, stand by without performing the transmission process in the current transmission and/or reception period to receive a signal from the at least one remote wireless device even in a case where there is information to be conveyed to the at least one remote wireless device,
   wherein the one or more processors cause the base wireless device to select either the signal transmission or the standby in the current transmission and/or reception period in accordance with a predetermined rule in a case that the signal transmission was selected in the previous transmission and/or reception period, and select the signal transmission in the current transmission and/or reception period in a case that the standby was selected in the previous transmission and/or reception period,
   wherein the one or more processors cause the base wireless device to use an algorithm for making a selection by generating a pseudo random number sequence, to select either the signal transmission or the standby.

2. A communication method of a base wireless device that transmits and receives signals to and from at least one remote wireless device in a transmission and/or reception period, the communication method comprising:
   a selection step of selecting either signal transmission or standby in a current transmission and/or reception period on a basis of information indicative of selection of either signal transmission or standby in a previous transmission and/or reception period; and
   a transmission processing step of, in a case that the signal transmission is selected in the selection step, performing a transmission process of transmitting a signal to the at least one remote wireless device in the current transmission and/or reception period, and, in a case that the standby is selected in the selection step, standing by without performing the transmission process in the current transmission and/or reception period to receive a signal from the at least one remote wireless device even in a case that there is information to be conveyed to the at least one remote wireless device,
   wherein in the selection step, either the signal transmission or the standby is selected in the current transmission and/or reception period in accordance with a predetermined rule in a case that the signal transmission was selected in the previous transmission and/or reception period, and the signal transmission is selected in the current transmission and/or reception period in a case that the standby was selected in the previous transmission and/or reception period,
   wherein, in the selection step, either the signal transmission or the standby is selected using an algorithm for making a selection by generating a pseudo random number sequence.

* * * * *

UNITED STATES PATENT AND TRADEMARK OFFICE
CERTIFICATE OF CORRECTION

PATENT NO. : 12,363,745 B2
APPLICATION NO. : 17/663732
DATED : July 15, 2025
INVENTOR(S) : Norimasa Ozaki et al.

It is certified that error appears in the above-identified patent and that said Letters Patent is hereby corrected as shown below:

In the Claims

Column 7, Line 44, Claim 1, after "reception" insert --period--.

Signed and Sealed this
Second Day of September, 2025

Coke Morgan Stewart
*Acting Director of the United States Patent and Trademark Office*